(12) United States Patent
Crandall

(10) Patent No.: US 9,235,041 B2
(45) Date of Patent: *Jan. 12, 2016

(54) SYSTEM AND METHOD FOR SINGLE OPTICAL AXIS MULTI-DETECTOR MICROSCOPE SLIDE SCANNER

(75) Inventor: Greg Crandall, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 640 days.

This patent is subject to a terminal disclaimer.

(21) Appl. No.: 13/453,797

(22) Filed: Apr. 23, 2012

(65) Prior Publication Data

US 2012/0206589 A1    Aug. 16, 2012

Related U.S. Application Data

(63) Continuation of application No. 11/679,422, filed on Feb. 27, 2007, now Pat. No. 8,164,622, which is a continuation-in-part of application No. 11/173,818, filed on Jul. 1, 2005, now Pat. No. 7,457,446.

(60) Provisional application No. 60/777,531, filed on Feb. 27, 2006.

(51) Int. Cl.
*H04N 7/18* (2006.01)
*G02B 21/36* (2006.01)

(52) U.S. Cl.
CPC .................................. *G02B 21/367* (2013.01)

(58) Field of Classification Search
USPC ..................................................... 348/78–80
See application file for complete search history.

(56) References Cited

U.S. PATENT DOCUMENTS

| | | |
|---|---|---|
| 3,643,015 A | 2/1972 | Davidovits et al. |
| 4,672,559 A | 6/1987 | Jansson |
| 4,673,988 A | 6/1987 | Jansson et al. |
| 4,700,298 A | 10/1987 | Palcic et al. |
| 4,700,928 A | 10/1987 | Marty |
| 4,742,558 A | 5/1988 | Ishibashi et al. |
| 4,744,642 A | 5/1988 | Yoshinaga et al. |
| 4,744,842 A | 5/1988 | Webster |

(Continued)

FOREIGN PATENT DOCUMENTS

| | | |
|---|---|---|
| CA | 2229175 | 8/1999 |
| DE | 2340860 | 3/1974 |

(Continued)

OTHER PUBLICATIONS

Adobe Developers Association, "TIFF" revision 6.0, Jun. 3, 1992; Adobe Systems Incorporated, Mountain View, CA, 121 pages.

(Continued)

*Primary Examiner* — Jude Jean Gilles
(74) *Attorney, Agent, or Firm* — Procopio, Cory, Hargreaves & Savitch LLP

(57) ABSTRACT

Systems and methods for microscope slide scanning using multiple sensor arrays that receive imagery data from a single optical axis are provided. A single, high quality, easily obtained microscope objective lens is used to project an image onto two or more sensor arrays. The sensor arrays can be linear or two dimensional and imaging takes place along a single optical axis. Simultaneous sensor acquisition and parallel data processing reduce the image acquisition time by a factor of N, where N represents the number of sensors employed.

20 Claims, 6 Drawing Sheets

(56) References Cited

U.S. PATENT DOCUMENTS

| | | | |
|---|---|---|---|
| 4,760,385 A | 7/1988 | Jansson et al. | |
| 4,777,525 A | 10/1988 | Preston et al. | |
| 4,806,015 A | 2/1989 | Cottingham | |
| 4,835,562 A | 5/1989 | Norita et al. | |
| 4,845,552 A | 7/1989 | Jaggi et al. | |
| 4,926,489 A | 5/1990 | Danielson | |
| 4,960,999 A | 10/1990 | McKean et al. | |
| 4,980,999 A | 1/1991 | Terenzoni | |
| 4,987,480 A | 1/1991 | Lippman et al. | |
| 5,086,477 A | 2/1992 | Yu et al. | |
| 5,097,127 A | 3/1992 | Hildenbrand et al. | |
| 5,130,651 A | 7/1992 | Morrey, Jr. | |
| 5,146,510 A | 9/1992 | Cox et al. | |
| 5,172,228 A | 12/1992 | Israelsen | |
| 5,185,638 A | 2/1993 | Conzola | |
| 5,187,754 A | 2/1993 | Currin et al. | |
| 5,231,663 A | 7/1993 | Earl et al. | |
| 5,235,167 A | 8/1993 | Dvorkis et al. | |
| 5,400,145 A | 3/1995 | Suita et al. | |
| 5,412,214 A | 5/1995 | Suzuki et al. | |
| 5,416,609 A | 5/1995 | Matsuda | |
| 5,434,629 A | 7/1995 | Pearson et al. | |
| 5,495,535 A | 2/1996 | Smilansky et al. | |
| 5,578,832 A | 11/1996 | Trulson et al. | |
| 5,633,948 A | 5/1997 | Kegelmeyer, Jr. | |
| 5,644,356 A | 7/1997 | Swinson et al. | |
| 5,649,022 A | 7/1997 | Maeda et al. | |
| 5,650,813 A | 7/1997 | Gilblom | |
| 5,672,861 A | 9/1997 | Fairley et al. | |
| 5,710,835 A | 1/1998 | Bradley | |
| 5,714,756 A | 2/1998 | Park et al. | |
| 5,754,291 A | 5/1998 | Kain | |
| 5,784,162 A | 7/1998 | Cabib et al. | |
| 5,790,710 A | 8/1998 | Price et al. | |
| 5,793,969 A | 8/1998 | Kamentsky et al. | |
| 5,796,861 A | 8/1998 | Vogt | |
| 5,822,055 A | 10/1998 | Tsai et al. | |
| 5,828,446 A | 10/1998 | Davis | |
| 5,834,758 A | 11/1998 | Trulson et al. | |
| 5,845,013 A | 12/1998 | Bouchard et al. | |
| 5,872,591 A | 2/1999 | Truc et al. | |
| 5,892,218 A | 4/1999 | Ortyn et al. | |
| 5,895,915 A | 4/1999 | Deweerd | |
| 5,904,652 A | 5/1999 | Gilbert et al. | |
| 5,912,699 A | 6/1999 | Hayenga et al. | |
| 5,922,282 A | 7/1999 | Ledley | |
| 5,932,872 A | 8/1999 | Price | |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,164 A | 12/1999 | Johansson | |
| 6,005,964 A | 12/1999 | Reid et al. | |
| 6,025,601 A | 2/2000 | Trulson et al. | |
| 6,049,421 A | 4/2000 | Raz et al. | |
| 6,055,097 A | 4/2000 | Lanni et al. | |
| 6,078,681 A | 6/2000 | Silver | |
| 6,091,846 A | 7/2000 | Lin et al. | |
| 6,101,265 A | 8/2000 | Bacus et al. | |
| 6,185,035 B1 | 2/2001 | Otsuki et al. | |
| 6,195,202 B1 | 2/2001 | Kusunose | |
| 6,211,955 B1 | 4/2001 | Basiji et al. | |
| 6,215,892 B1 | 4/2001 | Douglass et al. | |
| 6,262,838 B1 | 7/2001 | Montagu | |
| 6,272,235 B1 | 8/2001 | Bacus et al. | |
| 6,288,782 B1 | 9/2001 | Worster et al. | |
| 6,327,377 B1 | 12/2001 | Rutenberg et al. | |
| 6,330,348 B1 | 12/2001 | Kerschmann et al. | |
| 6,341,179 B1 | 1/2002 | Stoyle et al. | |
| 6,388,809 B1 | 5/2002 | MacAulay | |
| 6,396,296 B1 | 5/2002 | Tarter et al. | |
| 6,396,941 B1 | 5/2002 | Bacus et al. | |
| 6,438,268 B1 | 8/2002 | Cockshott et al. | |
| 6,449,048 B1 | 9/2002 | Olszak | |
| 6,519,357 B2 | 2/2003 | Takeuchi | |
| 6,545,761 B1 | 4/2003 | Aziz et al. | |
| 6,580,502 B1 | 6/2003 | Kuwabara | |
| 6,594,401 B1 | 7/2003 | Metcalfe et al. | |
| 6,677,656 B2 | 1/2004 | Francois | |
| 6,693,716 B2 | 2/2004 | Sieckmann | |
| 6,711,283 B1 | 3/2004 | Soenksen | |
| 6,714,281 B1 | 3/2004 | Amano et al. | |
| 6,763,140 B1 | 7/2004 | Skoll | |
| 6,816,606 B2 | 11/2004 | Feineigle et al. | |
| 6,876,776 B2 | 4/2005 | Recht | |
| 6,917,696 B2 | 7/2005 | Soenksen | |
| 6,922,479 B2 | 7/2005 | Berliner | |
| 6,970,789 B2 | 11/2005 | Ippolito et al. | |
| 7,035,478 B2 | 4/2006 | Crandall et al. | |
| 7,106,895 B1 | 9/2006 | Goldberg et al. | |
| 7,109,459 B2 | 9/2006 | Kam et al. | |
| 7,155,049 B2 | 12/2006 | Wetzel et al. | |
| 7,212,667 B1 | 5/2007 | Shin et al | |
| 7,247,825 B2 | 7/2007 | Soenksen et al. | |
| 7,248,282 B2 | 7/2007 | Maddison | |
| 7,312,919 B2 | 12/2007 | Overbeck | |
| 7,338,168 B2 | 3/2008 | Cartlidge et al. | |
| 7,428,324 B2 | 9/2008 | Crandall et al. | |
| 7,457,446 B2* | 11/2008 | Soenksen | 382/128 |
| 7,596,249 B2 | 9/2009 | Bacus et al. | |
| 7,668,362 B2 | 2/2010 | Olson et al. | |
| 7,702,181 B2 | 4/2010 | Gouch | |
| 7,826,649 B2 | 11/2010 | Crandall et al. | |
| 8,164,622 B2* | 4/2012 | Crandall | 348/79 |
| 2001/0012069 A1 | 8/2001 | Derndinger | |
| 2001/0013960 A1 | 8/2001 | Popovich et al. | |
| 2001/0017941 A1 | 8/2001 | Chaddha | |
| 2002/0001089 A1 | 1/2002 | Price | |
| 2002/0071125 A1 | 6/2002 | Sieckmann | |
| 2002/0090127 A1 | 7/2002 | Wetzel et al. | |
| 2002/0114497 A1 | 8/2002 | Wetzel et al. | |
| 2003/0095700 A1 | 5/2003 | Yu et al. | |
| 2003/0184730 A1 | 10/2003 | Price | |
| 2003/0197791 A1 | 10/2003 | Ogino | |
| 2003/0215936 A1 | 11/2003 | Kallioniemi et al. | |
| 2003/0222197 A1 | 12/2003 | Reese et al. | |
| 2004/0004614 A1 | 1/2004 | Bacus et al. | |
| 2004/0004759 A1 | 1/2004 | Olszak | |
| 2004/0105000 A1* | 6/2004 | Yuri | 348/79 |
| 2004/0170312 A1 | 9/2004 | Soenksen | |
| 2004/0232321 A1 | 11/2004 | Miles et al. | |
| 2004/0257360 A1 | 12/2004 | Sieckmann | |
| 2005/0089208 A1* | 4/2005 | Dong et al. | 382/133 |
| 2005/0093982 A1 | 5/2005 | Kuroki | |
| 2005/0237383 A1* | 10/2005 | Soga | 348/36 |
| 2007/0031056 A1 | 2/2007 | Perz | |
| 2007/0159688 A1 | 7/2007 | Descour et al. | |
| 2007/0187571 A1 | 8/2007 | Ebe et al. | |
| 2009/0028414 A1 | 1/2009 | Crandall et al. | |

FOREIGN PATENT DOCUMENTS

| | | |
|---|---|---|
| DE | 10232242 | 2/2004 |
| EP | 0339582 | 4/1989 |
| EP | 0363931 | 4/1990 |
| EP | 0796005 | 9/1997 |
| EP | 0871052 | 10/1998 |
| EP | 1610166 | 12/2005 |
| JP | 1986094014 | 5/1986 |
| JP | 4194905 | 7/1992 |
| JP | 0576005 | 3/1993 |
| JP | H05-76005 | 3/1993 |
| JP | 9197290 | 7/1997 |
| JP | 10-282010 A | 10/1998 |
| JP | 11211988 | 8/1999 |
| JP | H11-211988 | 8/1999 |
| JP | 11-271622 A | 10/1999 |
| JP | 2001210263 | 8/2001 |
| JP | 2002042706 | 2/2002 |
| JP | 2002-258163 | 11/2002 |
| JP | 2004-007413 A | 1/2004 |
| JP | 2004-514920 A | 5/2004 |

(56) References Cited

FOREIGN PATENT DOCUMENTS

| JP | 2005-136868 A | 5/2005 |
|---|---|---|
| JP | 2006-011446 A | 1/2006 |
| JP | 2007-525689 A | 9/2007 |
| JP | 07243823 | 4/2009 |
| WO | WO9114342 | 9/1991 |
| WO | WO9720198 | 6/1997 |
| WO | WO9820445 | 5/1998 |
| WO | WO9839728 | 9/1998 |
| WO | WO9844333 | 10/1998 |
| WO | WO9844446 | 10/1998 |
| WO | WO9852018 | 11/1998 |
| WO | WO0184209 | 11/2001 |
| WO | WO2004008218 | 1/2004 |
| WO | WO2006023675 | 3/2006 |

OTHER PUBLICATIONS

Catalyurek, Umit et al. The Virtual Microscope, 18 pages, date unknown, admitted as prior art for this application.
Cited reference analyses, obtained from U.S. Patent Office Website from 95/000,518, dated Nov. 23, 2009, 41 pages.
Communication dated Mar. 3, 2011 and Supplemental European Search Report dated Mar. 21, 2011 from EP07757561, 9 pages.
Communication for EP08832405.8 dated Nov. 11, 2011, 5 pages.
European Patent Office Supplementary search report, European Patent Application No. 04750306.5-2217, issued Sep. 11, 2008, 4 pages.
European Patent Search Report for related EP No. 08163003.0 issued Jul. 28, 2011, 5 pages.
European Search Report and Opinion for EP10184724.2 dated Apr. 28, 2011, 9 pages.
Glatz-Krieger et al. Virtual Slides: High-Quality Demand, Physical Limitations, and Affordability, Human Pathology, vol. 34, No. 10, Oct. 2003, pp. 968-974.
Greenfield Sluder and David E. Wold eds., Methods in Cell Biology, vol. 56, Chapter 2, (1998), 47 pages.
Hamilton, Eric, JPEG File Interchange Format:, Version 1.02, Sep. 1, 1992; C-Cube Microsystem, Milpitas, CA, 9 pages.
Hoppe, Hugues et al. Surface Reconstruction from Unorganized Points, Computer Graphics, 26, Jul. 2, 1992, pp. 71-78.
Hunt, Circumference imaging for optical based identification of cylindrical and conical objects, Feb. 1, 1997, 13 pages.
International preliminary examination report for PCT/US01/08028 dated Mar. 15, 2004, 4 pages.
International Preliminary Report on Patentability from PCT/US2008/62504 Nov. 19, 2009, 7 pages.
International search report for PCT/US01/08028 dated Jun. 28, 2002, 6 pages.
Kawaji, A., "3D attitude control system for bio-micromanipulation", Sep. 9-12, 2001, Micromechatronics and Human Science, 2001, MHS 2001, Proceedings of 2001 International Symposium on, pp. 197-202.
Notice of Reasons for Rejection from the Japan Patent Office dated Nov. 12, 2010 (and English translation) from JP2001-581174, 5 pages.
PCT/IPEA/409 International Application No. PCT/US04/11966, International Preliminary Examination Report, Apr. 22, 2005.
PCT/ISA/210 International Application No. PCT/US04/11966, International Search Report issued Oct. 13, 2004, 1 page.
PCT/ISA/237 International Application No. PCT/US04/11966, Written Opinion of the International Searching Authority issued Oct. 13, 2004, 16 pages.
United States Patent and Trademark Office, office action issued Jul. 21, 2008, U.S. Appl. No. 10/827,207, 16 pages.
United States Patent and Trademark Office, office action issued Oct. 25, 2007, U.S. Appl. No. 10/827,207, 19 pages.
US Receiving Office, International Search Report, International Application No. PCT/US07/62890, Feb. 20, 2008, 2 pages.
US Receiving Office, Written Opinion, International Application No. PCT/US07/62890, Feb. 20, 2008, 4 pages.
Wang, Hanzi et al. Robust Fitting by Adaptive-Scale Residual Consensus, Computer Graphics, vol. 26, No. 2, Jul. 1, 1992, 13 pages.
Notice of Reasons for Rejection issued by the Japanese Patent Office in Japanese Patent Application No. 2008-557466, transmitted Jan. 24, 2012, 4 pages.

\* cited by examiner

Optical Field of View

Direction of Scan

SYSTEM AND METHOD FOR SINGLE OPTICAL AXIS MULTI-DETECTOR MICROSCOPE SLIDE SCANNER

RELATED APPLICATION

The present application is a continuation of U.S. patent application Ser. No. 11/679,422 filed on 27 Feb. 2007, which claims priority to U.S. provisional patent application Ser. No. 60/777,531 filed on 27 Feb. 2006, and is a continuation-in-part of U.S. patent application Ser. No. 11/173,818 filed on 1 Jul. 2005, now U.S. Pat. No. 7,457,446 issued 25 Nov. 2008, each of which is incorporated herein by reference in its entirety.

BACKGROUND

1. Field of the Invention

The present invention generally relates to virtual microscopy and more specifically relates to systems and methods for multi-detector microscope slide scanning using a single optical axis.

2. Related Art

Conventional image tiling microscope slide scanners utilize a single optical axis which projects a magnified image of a small region of a microscope slide specimen onto a two dimensional sensor array. To fully image an entire specimen requires hundreds or thousands of individual images captured by the two dimensional sensor array, commonly referred to as "tiles." The total time to image the specimen is a result of the size of each tile, and the time duration of each exposure. One example of an image tiling solution can be found in U.S. Pat. No. 6,272,235.

FIG. 1 depicts the geometry of a single optical axis, two dimensional sensor array scanning system (a conventional image tiling system). The field of view of the magnification optics is circular, and is typically matched to the vertical and horizontal dimensions of the two dimensional sensor array. The array has "pixels" arranged in a pattern of "n" pixels per row, and comprises a total of "m" rows and "n" columns. A single exposure captures an image of only a small portion of the specimen. The specimen is then moved to a new region, and another exposure is made, thus building up a composite image comprising many hundreds, or thousands of tiles. If more sensors could be utilized in parallel, with adequate data processing, the image acquisition time would be reduced drastically. Unfortunately, the field of view of the optics is not sufficiently large to allow additional sensors, so the speed of image acquisition is limited by the speed of the acquisition device. Acquisition times for tiling systems are typically measured in tens of minutes or even hours.

Other scanning systems (e.g., parallel optical path scanning systems) use multiple objective lenses traveling in parallel paths across the specimen. These multi-axis systems require dozens of independent miniaturized microscope objective lenses (i.e., parallel optical paths), each path exposing a different region of a large two dimensional sensor array as the objective lenses move across the specimen, which greatly increases the speed of image acquisition. By using a staggered, two dimensional pattern of optical elements, and multiple exposures while the specimen moves, the entire specimen area is exposed to various sections of the 2-D sensor array. This type of system requires a custom fabricated two dimensional sensor array. Quoted image acquisition times are on the order of one minute for this type of system. One example of a multi-axis, parallel optical path scanning solution can be found in U.S. Pat. No. 6,842,290.

A third type of scanning system is referred to as a line scanning system and makes use of a linear sensor array. The technique and advantages of line scanning with a linear array are described in U.S. Pat. No. 6,711,283, which is incorporated herein by reference in its entirety. FIG. illustrates a single linear array "n" pixels wide onto which is projected a magnified image of a microscope slide. The specimen is moved at constant velocity "v" as a consecutive series of exposures are taken (S1, S2 . . . Sm), resulting in a long, vertical stripe of pixel dimensions "n" width by "m" height, where "m" is limited only by the total height of the specimen (or the distance traveled by the linear array, which may be greater than the height of the specimen). The required velocity is determined by simply computing how far the specimen must move (one pixel height "h") during the exposure time "t" of each line.

$v = h/t$

Typical values based upon resolution requirements and available camera designs are h=0.5 micron, t=109 microsecond, and sensor width n=2000 pixels. This results in a scanning velocity of 4.59 mm/sec, and a width of 1.0 mm. For a typical specimen size of 15×15 mm, the entire image is comprised of 15 stripes each 15 mm in height. Since the specimen is moving continuously at 4.59 mm/sec, each stripe is scanned in about 3.26 seconds, for a total image acquisition time of 49 sec. In practice, the total image acquisition time is increased due to limitations in transferring the large amounts of data over the computer bus, along with the time needed to compute best focus, and perform several other data processing steps. Depending on the speed of the data processing computer, three minutes is a representative time for the entire process.

SUMMARY

Certain embodiments described herein include multiple sensor arrays that receive imagery data along a single optical axis (i.e., from a single objective lens) to greatly increase the scanning performance. Accordingly, a single, high quality, easily obtained microscope objective lens is used to project an image onto two or more sensor arrays. The sensor arrays can be linear or two dimensional and receive image data along a single optical axis. Simultaneous sensor acquisition and parallel data processing reduce the image acquisition time by a factor of n, where n represents the number of sensors employed. Other features and advantages will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments disclosed herein describe single optical axis microscope slide scanning systems and methods that take a very different approach to solving the scanning problem and have several advantages in speed, image quality and simplicity of design. The embodiments disclosed herein combine the simplicity and optical advantages of a single optical axis, with the speed afforded by multiple sensor arrays.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Some of the advantages of a single optical axis include: (1) a single, high quality, commercially available microscope objective can outperform the miniaturized, molded plastic micro lens array required by the multiple parallel optical path (i.e., multiple objective lenses) approach; (2) when alternate scanning resolutions are required for different specimen types, it is a simple matter to substitute a suitable microscope objective; (3) rather than relying on complex, difficult to manufacture micro lens arrays and custom detector designs, commonly available, less costly cameras and optics may be employed; and (4) scanning speed may be increased simply by adding additional sensors.

Figure 1:
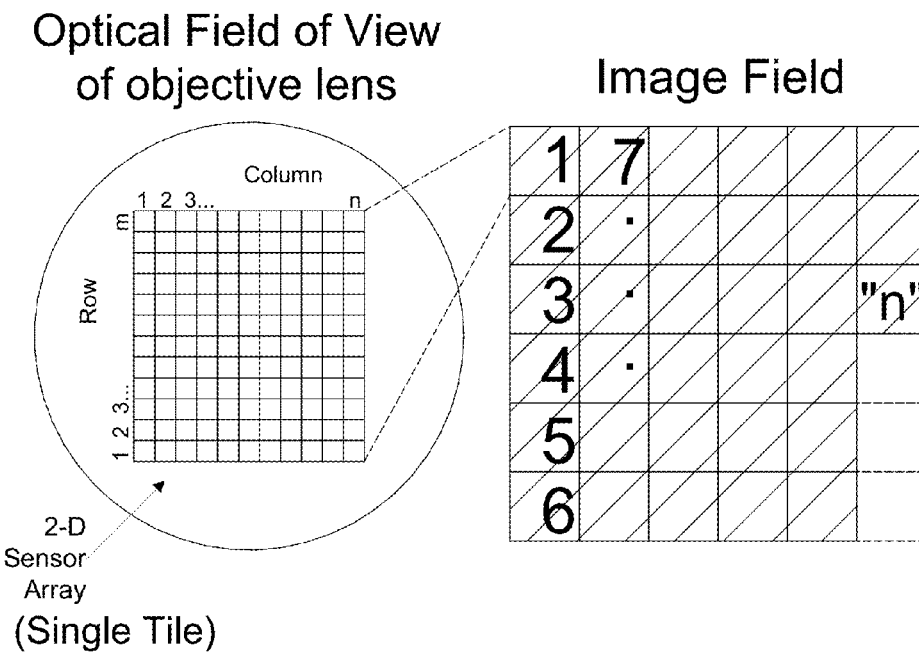
FIG. 1 is a block diagram illustrating a conventional single optical axis, single two dimensional array image tile scanning system.
Figure 2:
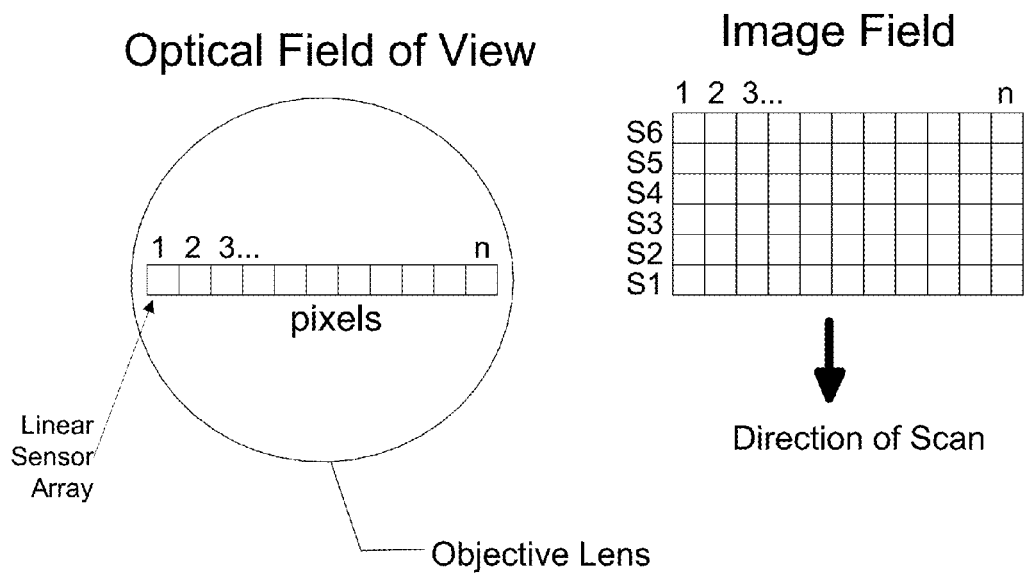
FIG. 2 is a block diagram illustrating an example single optical axis, single linear array line scanning system, according to an embodiment of the present invention.

In FIG. 2, the single linear array provides space for additional arrays (not pictured) within the single field of view. Numerous linear arrays could be positioned above or below the central array, and still be well within the central portion of the objective lens that produces images having the least optical distortion. Since the total area scanned in any time period is limited by the maximum line rate of the sensor, faster cameras can scan more lines per second. Alternatively, multiple sensors of identical line rates could be sampled concurrently, thus doubling or tripling the effective line rate of the system. Accordingly, the scanning system is configured to synchronize the exposures of multiple sensors with the corresponding positions of multiple sensors.

Figure 3:
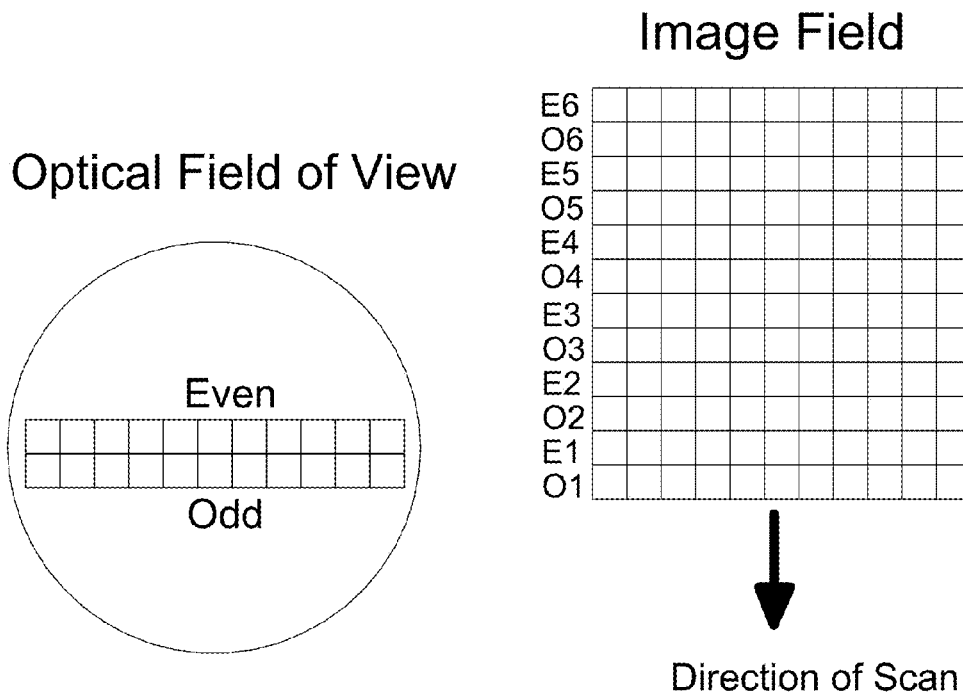
FIG. 3 is a block diagram illustrating an example single optical axis, multiple linear array line scanning system, according to an embodiment of the present invention.

FIG. 3 demonstrates a simple case comprising two arrays, referred to as odd and even. In the illustrated embodiment, the two arrays are located immediately adjacent to each other. When they are simultaneously exposed, two adjacent scan lines (O1 and E1) are be captured by the system in the amount of time it would otherwise take to acquire a single line. Because the specimen moves at substantially constant velocity v in a single sensor line scanning embodiment, in a double sensor line scanning embodiment as illustrated in FIG. 3 the scan velocity must be doubled to 2 v to avoid duplicating captured scan lines. Additionally, the exposure time of each sensor must be halved to t/2. This results in each sensor effectively skipping the lines scanned by the other sensor.

In the illustrated embodiment, this is shown as the odd sensor exposing all of the odd lines, and the even sensor exposing all of the even lines to fill in the gaps. Since this is all done at the maximum line rate of the sensor, the scan time is reduced by a factor of two. Furthermore, with appropriate sensor spacing and timing, the speed can be increased several fold. Using typical values discussed earlier, a three linear sensor array system will scan the same 15×15 mm area in slightly over 16 seconds. With such short scan times, it becomes unnecessary to detect and scan only those regions of the slide containing tissue. The entire slide area may be routinely scanned, thus avoiding any possibility of missing very small, but potentially important specimen fragments.

Although linear arrays are commonly one pixel high by N pixels wide, in one embodiment it is impractical to physically place them immediately side-by-side due to the necessary space required around the edges of the array for electrical connections. Rather than designing a custom (and expensive) sensor of very narrow dimensions, a far more cost effective approach is to use conventional, affordable sensors and to logically orient the sensors so they are both parallel and contiguous using a simple optical arrangement.

Figure 4:
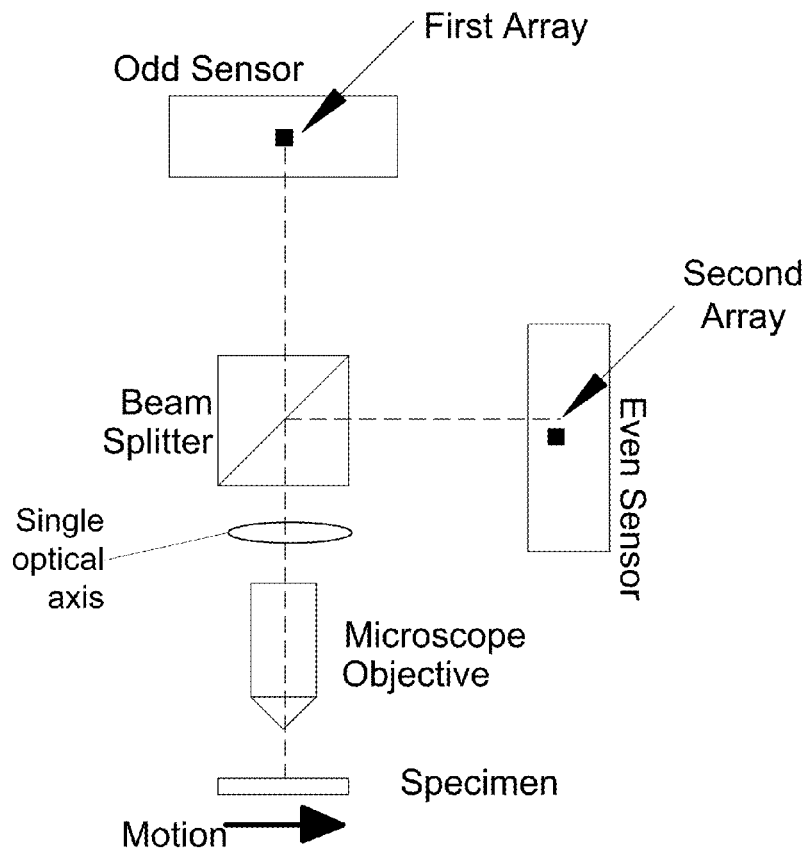
FIG. 4 is a block diagram illustrating an example single optical axis, multiple linear array line scanning system with a beam splitter, according to an embodiment of the present invention.

Accordingly, in one embodiment the scanning system employs an "N-way" beam splitter, such that the single optical path is directed to N sensors, as shown in FIG. 4. This requires the sensors to be mounted in such a way that each sensor is parallel and offset from its logical neighbor by the correct amount (an integer number of pixels). In the two sensor example of FIG. 4, the Even Sensor is shifted down by one pixel dimension. Alternatively, the sensors may be mounted exactly co-linear, and the exposure timing circuit can alternate exposures to ping-pong between sensors.

In one embodiment, with minor modification the multiple sensor arrangement depicted in FIG. 4 may also be used to acquire simultaneous images at multiple focus levels. For example, some specimen types have thickness which exceeds the depth of field of the imaging optics. The common technique for dealing with this is to scan the specimen at several different focus depths, and allow the user to select the best focus layer while viewing the scanned image. The main difficulty with this technique, other that the increased acquisition time, is that it puts stringent requirements on the stage positioning system controlling the motion of the specimen. If the lateral positions of each focus layer are not identical, to sub-micron accuracy, then there will be lateral shifting of the image as the user moves between different layers.

Advantageously, one or more optical elements are inserted in the optical path of one or more sensors in the scanning system to change the focus depth by an exact amount. In an alternative embodiment, the sensors are mounted at slightly different longitudinal distances from the specimen, resulting in the same effect. The benefit of this simple scheme is that any slight lateral positioning errors would affect all sensors simultaneously, therefore resulting in constant position errors at all focal layers.

For ease of discussion, the previous descriptions did not distinguish if the sensors were grayscale or color. Although the concept is slightly more complicated for color sensors, the same principles apply. The two most common methods for achieving color, while still maintaining 100% fill factor pixels, are "beam-splitter cameras" or "tri-linear array" sensors. Since a grayscale pixel does not actually sense color, some grouping of three pixels, each able to detect one of three colors (typically red, green, or blue) are employed.

In a beam splitter camera, the primary optical path is divided within the camera into three paths, one path each for red, green and blue. Each of these paths within the camera has a single grayscale linear detector. When these three lines of overlapping pixels are combined, the result is identical to a full color (RGB) array. This type of camera, although mechanically and optically complex is simple to understand in use because for all practical purposes, it is simply a single linear array capable of sensing color. Beam splitter cameras are the most common form of color line scan camera. In one embodiment, multiple color cameras of this type can be employed to provide color scanning in the single optical path, multiple sensor system described herein.

A second form of color line scan camera is much simpler both mechanically and optically, and therefore less expensive. It is called a tri-linear array. It is typically a single silicon substrate, comprising three parallel linear sensor arrays. Each linear sensor array is covered with a red, green or blue filter. The data processing for this type of camera is more complicated. At any instant, the three rows are not imaging exactly the same region because they are mechanically offset by a small amount (the distance between the linear sensor arrays). Accordingly, the image processing software or the camera algorithms must perform what is called a "spatial correction" which overlaps the correct rows which were sampled at slightly different times.

Figure 5:
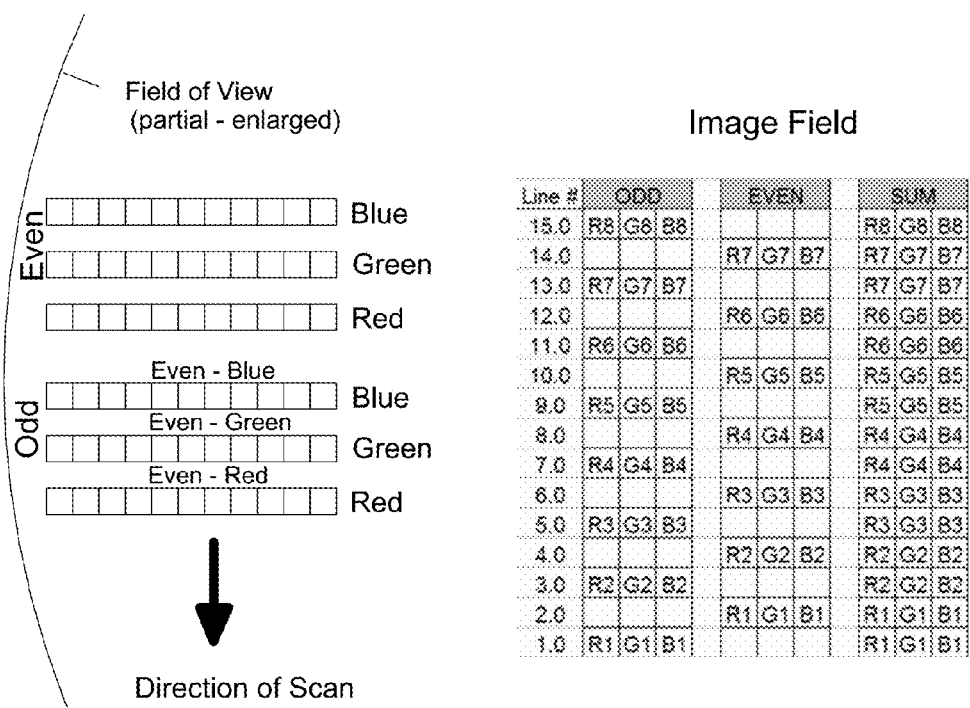
FIG. 5 is a block diagram illustrating an example single optical axis, multiple linear array line scanning system using tri-linear sensor arrays to capture color, according to an embodiment of the present invention.

FIG. 5 depicts a method for arranging two tri-linear arrays such that they sample alternate line spaces, resulting in a full color RGB sample. An enlarged portion of the optical field of view is shown on the left side of FIG. 5. Two tri-linear arrays are physically positioned as shown. By using a two way beam splitter, the "even" array is optically positioned in the blank spaces between the RGB lines of the "odd" array. In this example, both sensors are exposed simultaneously. During the first exposure period, the specimen passes under the objective lens and is exposed to all three of the RGB lines, resulting in the capture of "line 1" and "line 2", as shown on the right side of FIG. 5. Since the specimen is moving at constant velocity 2V, the next exposure period captures lines 3 and 4. As this process continues, every pixel location is captured in all three colors at twice the speed possible with only a single sensor.

There are several factors which limit the maximum speed of any microscope slide scanning system. The maximum pixel rate of the camera is determined by the design of the sensor, and the availability of sufficiently high illumination intensity required for very short exposure times. High speed cameras operate at or near the maximum data rate of a typical high speed PCI data bus. Data compression, almost a necessity because of the large image sizes, depends on the speed of the computer. And finally, the amount of computer memory limits the size of the largest image buffers.

Advantageously, multiple sensor scanning eliminates these limitations by allowing parallel data processing paths. In the simplest terms, each sensor may be assigned to a dedicated "data channel." Pixels acquired from a given sensor at maximum speed are transferred to a dedicated computer (e.g., processor) using a dedicated frame grabber. Image processing, including spatial correction and data compression may be performed independently, with the final image file being created after all of the parallel processing has been completed. With modern computer architecture, these benefits may be achieved with a single computer comprised of multiple processor units, multiple data buses, and the operating systems which support them.

Figure 6:
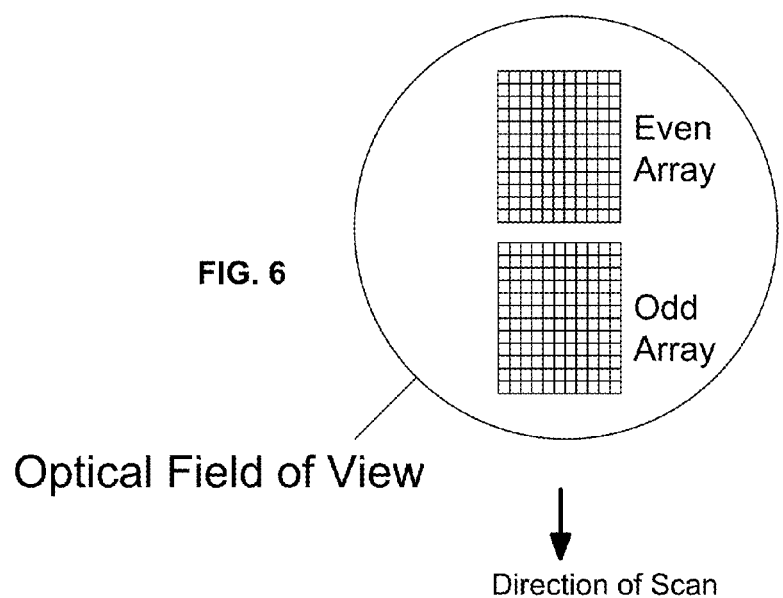
FIG. 6 is a block diagram illustrating an example single optical axis, multiple two dimensional array image tile scanning system, according to an embodiment of the present invention.

The performance advantages of single optical axis, multi sensor scanning are not limited to linear arrays. The most common tiling camera sensor dimensions are between ¼ to ½ inch. Since good quality microscope objective lenses are capable of projecting an image of at least 1 inch in diameter at the necessary resolution, it is possible to arrange more than one two dimensional sensor array within the optical field of view, as suggested in FIG. 6.

Figure 7:
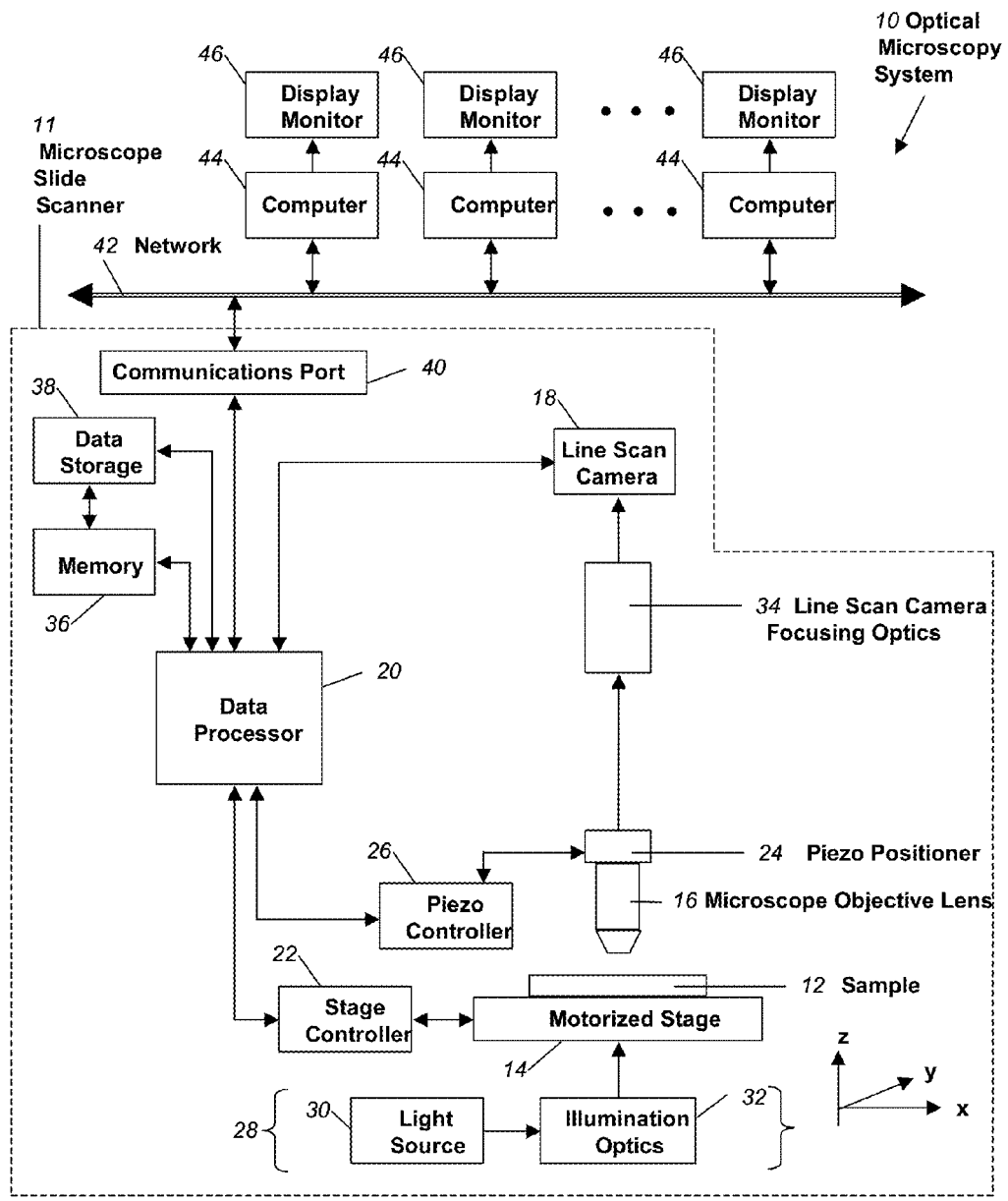
FIG. 7 is a block diagram of an example optical microscopy system, according to an embodiment of the present invention.

Turning to FIG. 7, a block diagram of a linear array optical microscopy system 10 according to one embodiment is shown. The heart of the system 10 is a microscope slide scanner 11 that serves to scan and digitize a specimen or sample 12. The sample 12 can be anything that may be interrogated by optical microscopy. For instance, the sample 12 may be a microscope slide or other sample type that may be interrogated by optical microscopy. A microscope slide is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 12 may also be an array of any type of DNA or DNA-related material such as cDNA or RNA or protein that is deposited on any type of slide or other substrate, including any and all samples commonly known as a microarrays. The sample 12 may be a microtiter plate, for example a 96-well plate. Other examples of the sample 12 include integrated circuit boards, electrophoresis records, petri dishes, film, semiconductor materials, forensic materials, or machined parts.

The scanner 11 includes a motorized stage 14, a microscope objective lens 16, a line scan camera 18, and a data processor 20. The sample 12 is positioned on the motorized stage 14 for scanning. The motorized stage 14 is connected to a stage controller 22 which is connected in turn to the data processor 20. The data processor 20 determines the position of the sample 12 on the motorized stage 14 via the stage controller 22. In one embodiment, the motorized stage 14 moves the sample 12 in at least the two axes (x/y) that are in the plane of the sample 12. Fine movements of the sample 12 along the optical z-axis may also be necessary for certain applications of the scanner 11, for example, for focus control. Z-axis movement is preferably accomplished with a piezo positioner 24, such as the PIFOC from Polytec PI or the MIPOS 3 from Piezosystem Jena. The piezo positioner 24 is attached directly to the microscope objective 16 and is connected to and directed by the data processor 20 via a piezo controller 26. A means of providing a coarse focus adjustment may also be needed and can be provided by z-axis movement as part of the motorized stage 14 or a manual rack-and-pinion coarse focus adjustment (not shown).

In one embodiment, the motorized stage 14 includes a high precision positioning table with ball bearing linear ways to provide smooth motion and excellent straight line and flatness accuracy. For example, the motorized stage 14 could include two Daedal model 106004 tables stacked one on top of the other. Other types of motorized stages 14 are also suitable for the scanner 11, including stacked single axis stages based on ways other than ball bearings, single- or multiple-axis positioning stages that are open in the center and are particularly suitable for trans-illumination from below the sample, or larger stages that can support a plurality of samples. In one embodiment, motorized stage 14 includes two stacked single-axis positioning tables, each coupled to two millimeter lead-screws and Nema-23 stepping motors. At the maximum lead screw speed of twenty-five revolutions per second, the maximum speed of the sample 12 on the motorized stage 14 is fifty millimeters per second. Selection of a lead screw with larger diameter, for example five millimeters, can increase the maximum speed to more than 100 millimeters per second. The motorized stage 14 can be equipped with mechanical or optical position encoders which has the disadvantage of adding significant expense to the system. Consequently, one embodiment does not include position encoders. However, if one were to use servo motors in place of stepping motors, then one would have to use position feedback for proper control.

Position commands from the data processor 20 are converted to motor current or voltage commands in the stage controller 22. In one embodiment, the stage controller 22 includes a 2-axis servo/stepper motor controller (Compumotor 6K2) and two 4-amp microstepping drives (Compumotor OEMZL4). Microstepping provides a means for commanding the stepper motor in much smaller increments than the relatively large single 1.8 degree motor step. For example, at a microstep of 100, the sample 12 can be commanded to move at steps as small as 0.1 micrometer. A microstep of 25,000 is used in one embodiment of this invention. Smaller step sizes are also possible. It should be obvious that the optimum selection of the motorized stage 14 and the stage controller 22 depends on many factors, including the nature of the sample 12, the desired time for sample digitization, and the desired resolution of the resulting digital image of the sample 12.

The microscope objective lens 16 can be any microscope objective lens commonly available. One of ordinary skill in the art will realize that the choice of which objective lens to use will depend on the particular circumstances. In one embodiment, the microscope objective lens 16 is of the infinity-corrected type.

The sample 12 is illuminated by an illumination system 28 that includes a light source 30 and illumination optics 32. The light source 30 in one embodiment includes a variable intensity halogen light source with a concave reflective mirror to maximize light output and a KG-1 filter to suppress heat. However, the light source 30 could also be any other type of arc-lamp, laser, or other source of light. The illumination optics 32 in one embodiment include a standard Köhler illumination system with two conjugate planes that are orthogonal to the optical axis. The illumination optics 32 are representative of the bright-field illumination optics that can be found on most commercially available compound microscopes sold by companies such as Carl Zeiss, Nikon, Olympus, or Leica. One set of conjugate planes includes (i) a field iris aperture illuminated by the light source 30, (ii) the object plane that is defined by the focal plane of the sample 12, and (iii) the plane containing the light-responsive elements of the line scan camera 18. A second conjugate plane includes (i) the filament of the bulb that is part of the light source 30, (ii) the aperture of a condenser iris that sits immediately before the condenser optics that are part of the illumination optics 32, and (iii) the back focal plane of the microscope objective lens 16. In one embodiment, the sample 12 is illuminated and imaged in transmission mode, with the line scan camera 18 sensing optical energy that is transmitted by the sample 12, or conversely, optical energy that is absorbed by the sample 12.

The scanner 11 of one embodiment is equally suitable for detecting optical energy that is reflected from the sample 12, in which case the light source 30, the illumination optics 32, and the microscope objective lens 16 must be selected based on compatibility with reflection imaging. One possible embodiment may therefore be illumination through a fiber optic bundle that is positioned above the sample 12. Other possibilities include excitation that is spectrally conditioned by a monochromator. If the microscope objective lens 16 is selected to be compatible with phase-contrast microscopy, then the incorporation of at least one phase stop in the condenser optics that are part of the illumination optics 32 will enable the scanner 11 to be used for phase contrast microscopy. To one of ordinary skill in the art, the modifications required for other types of microscopy such as differential interference contrast and confocal microscopy should be readily apparent. Overall, the scanner 11 is suitable, with appropriate but well-known modifications, for the interrogation of microscopic samples in any known mode of optical microscopy.

Between the microscope objective lens 16 and the line scan camera 18 are situated the line scan camera focusing optics 34 that focus the optical signal captured by the microscope objective lens 16 onto the light-responsive elements of the line scan camera 18. In a modern infinity-corrected microscope the focusing optics between the microscope objective lens and the eyepiece optics, or between the microscope objective lens and an external imaging port, consist of an optical element known as a tube lens that is part of a microscope's observation tube. Many times the tube lens consists of multiple optical elements to prevent the introduction of coma or astigmatism. One of the motivations for the relatively recent change from traditional finite tube length optics to infinity corrected optics was to increase the physical space in which the optical energy from the sample 12 is parallel, meaning that the focal point of this optical energy is at infinity. In this case, accessory elements like dichroic mirrors or filters can be inserted into the infinity space without changing the optical path magnification or introducing undesirable optical artifacts.

Infinity-corrected microscope objective lenses are typically inscribed with an infinity mark. The magnification of an infinity corrected microscope objective lens is given by the quotient of the focal length of the tube lens divided by the focal length of the objective lens. For example, a tube lens with a focal length of 180 millimeters will result in 20× magnification if an objective lens with 9 millimeter focal length is used. One of the reasons that the objective lenses manufactured by different microscope manufacturers are not compatible is because of a lack of standardization in the tube lens focal length. For example, a 20× objective lens from Olympus, a company that uses a 180 millimeter tube lens focal length, will not provide a 20× magnification on a Nikon microscope that is based on a different tube length focal length of 200 millimeters. Instead, the effective magnification of such an Olympus objective lens engraved with 20× and having a 9 millimeter focal length will be 22.2×, obtained by dividing the 200 millimeter tube lens focal length by the 9 millimeter focal length of the objective lens. Changing the tube lens on a conventional microscope is virtually impossible without disassembling the microscope. The tube lens is part of a critical fixed element of the microscope. Another contributing factor to the incompatibility between the objective lenses and microscopes manufactured by different manufacturers is the design of the eyepiece optics, the binoculars through which the specimen is observed. While most of the optical corrections have been designed into the microscope objective lens, most microscope users remain convinced that there is some benefit in matching one manufacturers' binocular optics with that same manufacturers' microscope objective lenses to achieve the best visual image.

The line scan camera focusing optics 34 include a tube lens optic mounted inside of a mechanical tube. Since the scanner 11, in its preferred embodiment, lacks binoculars or eyepieces for traditional visual observation, the problem suffered by conventional microscopes of potential incompatibility between objective lenses and binoculars is immediately eliminated. One of ordinary skill will similarly realize that the problem of achieving parfocality between the eyepieces of the microscope and a digital image on a display monitor is also eliminated by virtue of not having any eyepieces. Since the scanner 11 also overcomes the field of view limitation of a traditional microscope by providing a field of view that is practically limited only by the physical boundaries of the sample 12, the importance of magnification in an all-digital imaging microscope such as provided by the present scanner 11 is limited. Once a portion of the sample 12 has been digitized, it is straightforward to apply electronic magnification, sometimes known as electric zoom, to an image of the sample 12 in order to increase its magnification. Increasing the magnification of an image electronically has the effect of increasing the size of that image on the monitor that is used to display the image. If too much electronic zoom is applied, then the display monitor will be able to show only portions of the magnified image. It is not possible, however, to use electronic magnification to display information that was not present in the original optical signal that was digitized in the first place. Since one of the objectives of the scanner 11 is to provide high quality digital images, in lieu of visual observation through the eyepieces of a microscope, it is important that the content of the images acquired by the scanner 11 include as much image detail as possible. The term resolution is typically used to describe such image detail and the term diffraction-limited is used to describe the wavelength-limited maximum spatial detail available in an optical signal. The scanner 11 provides diffraction-limited digital imaging by selection of a tube lens focal length that is matched according to the well know Nyquist sampling criteria to both the size of an individual pixel element in a light-sensing camera such as the line scan camera 18 and to the numerical aperture of the microscope objective lens 16. It is well known that numerical aperture, not magnification, is the resolution-limiting attribute of a microscope objective lens 16.

An example will help to illustrate the optimum selection of a tube lens focal length that is part of the line scan camera focusing optics 34. Consider again the 20× microscope objective lens 16 with 9 millimeter focal length discussed previously and assume that this objective lens has a numerical aperture of 0.50. Assuming no appreciable degradation from the condenser, the diffraction-limited resolving power of this objective lens at a wavelength of 500 nanometers is approximately 0.6 micrometers, obtained using the well-known Abbe relationship. Assume further that the line scan camera 18, which in its preferred embodiment has a plurality of 14 micrometer square pixels, is used to detect a portion of the sample 12. In accordance with sampling theory, it is necessary that at least two sensor pixels subtend the smallest resolvable spatial feature. In this case, the tube lens must be selected to achieve a magnification of 46.7, obtained by dividing 28 micrometers, which corresponds to two 14 micrometer pixels, by 0.6 micrometers, the smallest resolvable feature dimension. The optimum tube lens optic focal length is therefore about 420 millimeters, obtained by multiplying 46.7 by 9. The line scan focusing optics 34 with a tube lens optic having a focal length of 420 millimeters will therefore be capable of acquiring images with the best possible spatial resolution, similar to what would be observed by viewing a specimen under a microscope using the same 20× objective lens. To reiterate, the scanner 11 utilizes a traditional 20× microscope objective lens 16 in a higher magnification optical configuration, in this example about 47×, in order to acquire diffraction-limited digital images. If a traditional 20× magnification objective lens 16 with a higher numerical aperture were used, say 0.75, the required tube lens optic magnification for diffraction-limited imaging would be about 615 millimeters, corresponding to an overall optical magnification of 68×. Similarly, if the numerical aperture of the 20× objective lens were only 0.3, the optimum tube lens optic magnification would only be about 28×, which corresponds to a tube lens optic focal length of approximately 252 millimeters. The line scan camera focusing optics 34 are modular elements of the scanner 11 and can be interchanged as necessary for optimum digital imaging. The advantage of diffraction-limited digital imaging is particularly significant for applications, for example bright field microscopy, in which the reduction in signal brightness that accompanies increases in magnification is readily compensated by increasing the intensity of an appropriately designed illumination system 28.

In principle, it is possible to attach external magnification-increasing optics to a conventional microscope-based digital imaging system to effectively increase the tube lens magnification so as to achieve diffraction-limited imaging as has just been described for the present scanner 11; however, the resulting decrease in the field of view is often unacceptable, making this approach impractical. Furthermore, many users of microscopes typically do not understand enough about the details of diffraction-limited imaging to effectively employ these techniques on their own. In practice, digital cameras are attached to microscope ports with magnification-decreasing optical couplers to attempt to increase the size of the field of view to something more similar to what can be seen through the eyepiece. The standard practice of adding de-magnifying optics is a step in the wrong direction if the goal is to obtain diffraction-limited digital images.

In a conventional microscope, different power objectives lenses are typically used to view the specimen at different resolutions and magnifications. Standard microscopes have a nosepiece that holds five objectives lenses. In an all-digital imaging system such as the present scanner 11 there is a need for only one microscope objective lens 16 with a numerical aperture corresponding to the highest spatial resolution desirable. One embodiment of the scanner 11 provides for only one microscope objective lens 16. Once a diffraction-limited digital image has been captured at this resolution, it is straightforward using standard digital image processing techniques, to present imagery information at any desirable reduced resolutions and magnifications.

One embodiment of the scanner 11 is based on a Dalsa SPARK line scan camera 18 with 1024 pixels (picture elements) arranged in a linear array, with each pixel having a dimension of 14 by 14 micrometers. Any other type of linear array, whether packaged as part of a camera or custom-integrated into an imaging electronic module, can also be used. The linear array in one embodiment effectively provides eight bits of quantization, but other arrays providing higher or lower level of quantization may also be used. Alternate arrays based on 3-channel red-green-blue (RGB) color information or time delay integration (TDI), may also be used. TDI arrays provide a substantially better signal-to-noise ratio (SNR) in the output signal by summing intensity data from previously imaged regions of a specimen, yielding an increase in the SNR that is in proportion to the square-root of the number of integration stages. TDI arrays can comprise multiple stages of linear arrays. TDI arrays are available with 24, 32, 48, 64, 96, or even more stages. The scanner 11 also supports linear arrays that are manufactured in a variety of formats including some with 512 pixels, some with 1024 pixels, and others having as many as 4096 pixels. Appropriate, but well known, modifications to the illumination system 28 and the line scan camera focusing optics 34 may be required to accommodate larger arrays. Linear arrays with a variety of pixel sizes can also be used in scanner 11. The salient requirement for the selection of any type of line scan camera 18 is that the sample 12 can be in motion with respect to the line scan camera 18 during the digitization of the sample 12 in order to obtain high quality images, overcoming the static requirements of the conventional imaging tiling approaches known in the prior art.

The output signal of the line scan camera 18 is connected to the data processor 20. The data processor 20 in one embodiment includes a central processing unit with ancillary electronics, for example a motherboard, to support at least one signal digitizing electronics board such as an imaging board or a frame grabber. In one embodiment, the imaging board is an EPIX PIXCID24 PCI bus imaging board, however, there are many other types of imaging boards or frame grabbers from a variety of manufacturers which could be used in place of the EPIX board. An alternate embodiment could be a line scan camera that uses an interface such as IEEE 1394, also known as Firewire, to bypass the imaging board altogether and store data directly on a data storage 38, such as a hard disk.

The data processor 20 is also connected to a memory 36, such as random access memory (RAM), for the short-term storage of data, and to the data storage 38, such as a hard drive, for long-term data storage. Further, the data processor 20 is connected to a communications port 40 that is connected to a network 42 such as a local area network (LAN), a wide area network (WAN), a metropolitan area network (MAN), an intranet, an extranet, or the global Internet. The memory 36 and the data storage 38 are also connected to each other. The data processor 20 is also capable of executing computer programs, in the form of software, to control critical elements of the scanner 11 such as the line scan camera 18 and the stage controller 22, or for a variety of image-processing functions, image-analysis functions, or networking. The data processor 20 can be based on any operating system, including operating systems such as Windows, Linux, OS/2, Mac OS, and Unix. In one embodiment, the data processor 20 operates based on the Windows NT operating system.

The data processor 20, memory 36, data storage 38, and communication port 40 are each elements that can be found in a conventional computer. One example would be a personal computer such as a Dell Dimension XPS T500 that features a Pentium III 500 MHz processor and up to 756 megabytes (MB) of RAM. In one embodiment, the computer, elements which include the data processor 20, memory 36, data storage 38, and communications port 40 are all internal to the scanner 11, so that the only connection of the scanner 11 to the other elements of the system 10 is the communication port 40. In an alternate embodiment of the scanner 11, the computer elements would be external to the scanner 11 with a corresponding connection between the computer elements and the scanner 11.

The scanner 11, in one embodiment of the invention, integrates optical microscopy, digital imaging, motorized sample positioning, computing, and network-based communications into a single-enclosure unit. The major advantage of packaging the scanner 11 as a single-enclosure unit with the communications port 40 as the primary means of data input and output are reduced complexity and increased reliability. The various elements of the scanner 11 are optimized to work together, in sharp contrast to traditional microscope-based imaging systems in which the microscope, light source, motorized stage, camera, and computer are typically provided by different vendors and require substantial integration and maintenance.

The communication port 40 provides a means for rapid communications with the other elements of the system 10, including the network 42. The presently preferred communications protocol for the communications port 40 is a carrier-sense multiple-access collision detection protocol such as Ethernet, together with the TCP/IP protocol for transmission control and internetworking. The scanner 11 is intended to work with any type of transmission media, including broadband, baseband, coaxial cable, twisted pair, fiber optics, DSL or wireless.

In one embodiment, control of the scanner 11 and review of the imagery data captured by the scanner 11 are performed on a computer 44 that is connected to the network 42. The computer 44, in its presently preferred embodiment, is connected to a display monitor 46 to provide imagery information to an operator. A plurality of computers 44 may be connected to the network 42. In one embodiment, the computer 44 communicates with the scanner 11 using a network browser such as Internet Explorer from Microsoft or Netscape Communicator from AOL. Images are stored on the scanner 11 in a common compressed format such a JPEG which is an image format that is compatible with standard image-decompression methods that are already built into most commercial browsers. Other standard or non-standard, lossy or lossless, image compression formats will also work. In one embodiment, the scanner 11 is a webserver providing an operator interface that is based on webpages that are sent from the scanner 11 to the computer 44. For dynamic review of imagery data, the currently preferred embodiment of the scanner 11 is based on playing back, for review on the display monitor 46 that is connected to the computer 44, multiple frames of imagery data using standard multiple-frame browser compatible software packages such as Media-Player from Microsoft, Quicktime from Apple Computer, or RealPlayer from Real Networks. In one embodiment, the browser on the computer 44 uses the hypertext transmission protocol (http) together with TCP for transmission control.

There are, and will be in the future, many different means and protocols by which the scanner 11 could communicate with the computer 44, or a plurality of computers. While one embodiment is based on standard means and protocols, the approach of developing one or multiple customized software modules known as applets is equally feasible and may be desirable for selected future applications of the scanner 11. Further, there are no constraints that computer 44 be of any specific type such as a personal computer (PC) or be manufactured by any specific company such as Dell. One of the advantages of a standardized communications port 40 is that any type of computer 44 operating common network browser software can communicate with the scanner 11.

If one so desires, it is possible, with some modifications to the scanner 11, to obtain spectrally resolved images. Spectrally resolved images are images in which spectral information is measured at every image pixel. Spectrally resolved images could be obtained by replacing the line scan camera 18 of the scanner 11 with an optical slit and an imaging spectrograph. The imaging spectrograph uses a two-dimensional CCD detector to capture wavelength-specific intensity data for a column of image pixels by using a prism or grating to disperse the optical signal that is focused on the optical slit along each of the rows of the detector.

Figure 8:
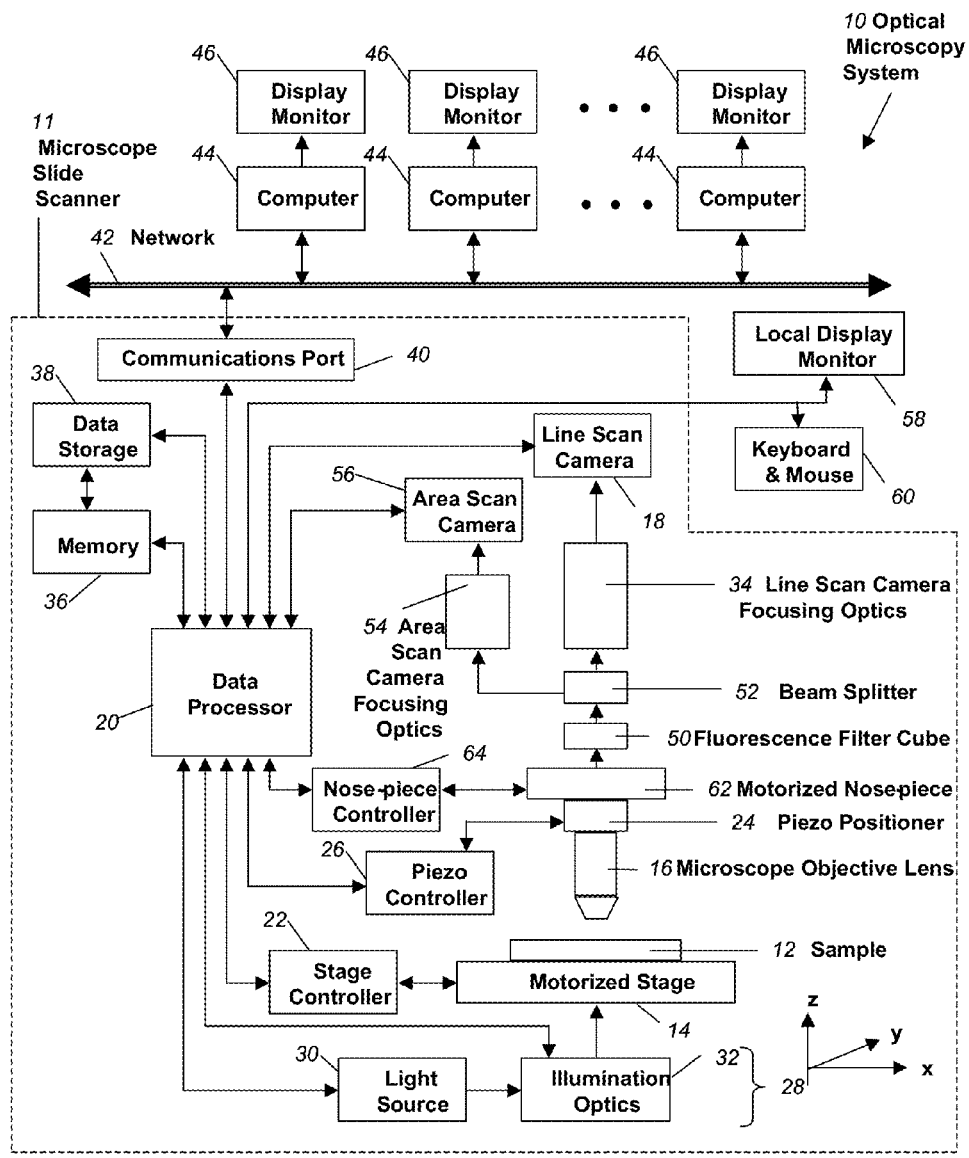
FIG. 8 is a block diagram of an example optical microscopy system, according to an embodiment of the present invention.

Turning now to FIG. 8, a block diagram of a second embodiment of an optical microscopy system 10 according to one embodiment is shown. In this system 10, the scanner 11 is more complex and expensive than the currently preferred embodiment shown in FIG. 7. The additional attributes of the scanner 11 that are shown do not all have to be present for any alternate embodiment to function correctly. FIG. 8 is intended to provide a reasonable example of additional features and capabilities that could be incorporated into the scanner 11.

The alternate embodiment of FIG. 8 provides for a much greater level of automation than one embodiment of FIG. 7. A more complete level of automation of the illumination system 28 is achieved by connections between the data processor 20 and both the light source 30 and the illumination optics 32 of the illumination system 28. The connection to the light source 30 may control the voltage, or current, in an open or closed loop fashion, in order to control the intensity of the light source 30. Recall that the light source 30 is a halogen bulb in one embodiment. The connection between the data processor 20 and the illumination optics 32 could provide closed loop control of the field iris aperture and the condenser iris to provide a means for ensuring that optimum Köhler illumination is maintained.

Use of the scanner 11 for fluorescence imaging requires easily recognized modifications to the light source 30, the illumination optics 32, and the microscope objective lens 16. The second embodiment of FIG. 8 also provides for a fluorescence filter cube 50 that includes an excitation filter, a dichroic filter, and a barrier filter. The fluorescence filter cube 50 is positioned in the infinity corrected beam path that exists between the microscope objective lens 16 and line scan camera focusing optics 34. One embodiment for fluorescence imaging could include the addition of a filter wheel or tunable filter into the illumination optics 32 to provide appropriate spectral excitation for the variety of fluorescent dyes or nanocrystals available on the market.

The addition of at least one beam splitter 52 into the imaging path allows the optical signal to be split into at least two paths. The primary path is via the line scan camera focusing optics 34, as discussed previously, to enable diffraction-limited imaging by the line scan camera 18. A second path is provided via an area scan camera focusing optics 54 for imaging by an area scan camera 56. It should be readily apparent that proper selection of these two focusing optics can ensure diffraction-limited imaging by the two camera sensors having different pixel sizes. The area scan camera 56 can be one of many types that are currently available, including a simple color video camera, a high performance, cooled, CCD camera, or a variable integration-time fast frame camera. The area scan camera 56 provides a traditional imaging system configuration for the scanner 11. The area scan camera 56 is connected to the data processor 20. If two cameras are used, for example the line scan camera 18 and the area scan camera 56, both camera types could be connected to the data processor using either a single dual-purpose imaging board, two different imaging boards, or the IEEE1394 Firewire interface, in which case one or both imaging boards may not be needed. Other related methods of interfacing imaging sensors to the data processor 20 are also available.

While the primary interface of the scanner 11 to the computer 44 is via the network 42, there may be instances, for example a failure of the network 42, where it is beneficial to be able to connect the scanner 11 directly to a local output device such as a display monitor 58 and to also provide local input devices such as a keyboard and mouse 60 that are connected directly into the data processor 20 of the scanner 11. In this instance, the appropriate driver software and hardware would have to be provided as well.

The second embodiment shown in FIG. 8 also provides for a much greater level of automated imaging performance. Enhanced automation of the imaging of the scanner 11 can be achieved by closing the focus control loop comprising the piezo positioner 24, the piezo controller 26, and the data processor 20 using well-known methods of autofocus. The second embodiment also provides for a motorized nose-piece 62 to accommodate several objectives lenses. The motorized nose-piece 62 is connected to and directed by the data processor 20 through a nose-piece controller 64.

There are other features and capabilities of the scanner 11 which could be incorporated. For example, the process of scanning the sample 12 with respect to the microscope objective lens 16 that is substantially stationary in the x/y plane of the sample 12 could be modified to comprise scanning of the microscope objective lens 16 with respect to a stationary sample 12. Scanning the sample 12, or scanning the microscope objective lens 16, or scanning both the sample 12 and the microscope objective lens 16 simultaneously, are possible embodiments of the scanner 11 which can provide the same large contiguous digital image of the sample 12 as discussed previously.

The scanner 11 also provides a general purpose platform for automating many types of microscope-based analyses. The illumination system 28 could be modified from a traditional halogen lamp or arc-lamp to a laser-based illumination system to permit scanning of the sample 12 with laser excitation. Modifications, including the incorporation of a photomultiplier tube or other non-imaging detector, in addition to or in lieu of the line scan camera 18 or the area scan camera 56, could be used to provide a means of detecting the optical signal resulting from the interaction of the laser energy with the sample 12.

Figure 9:
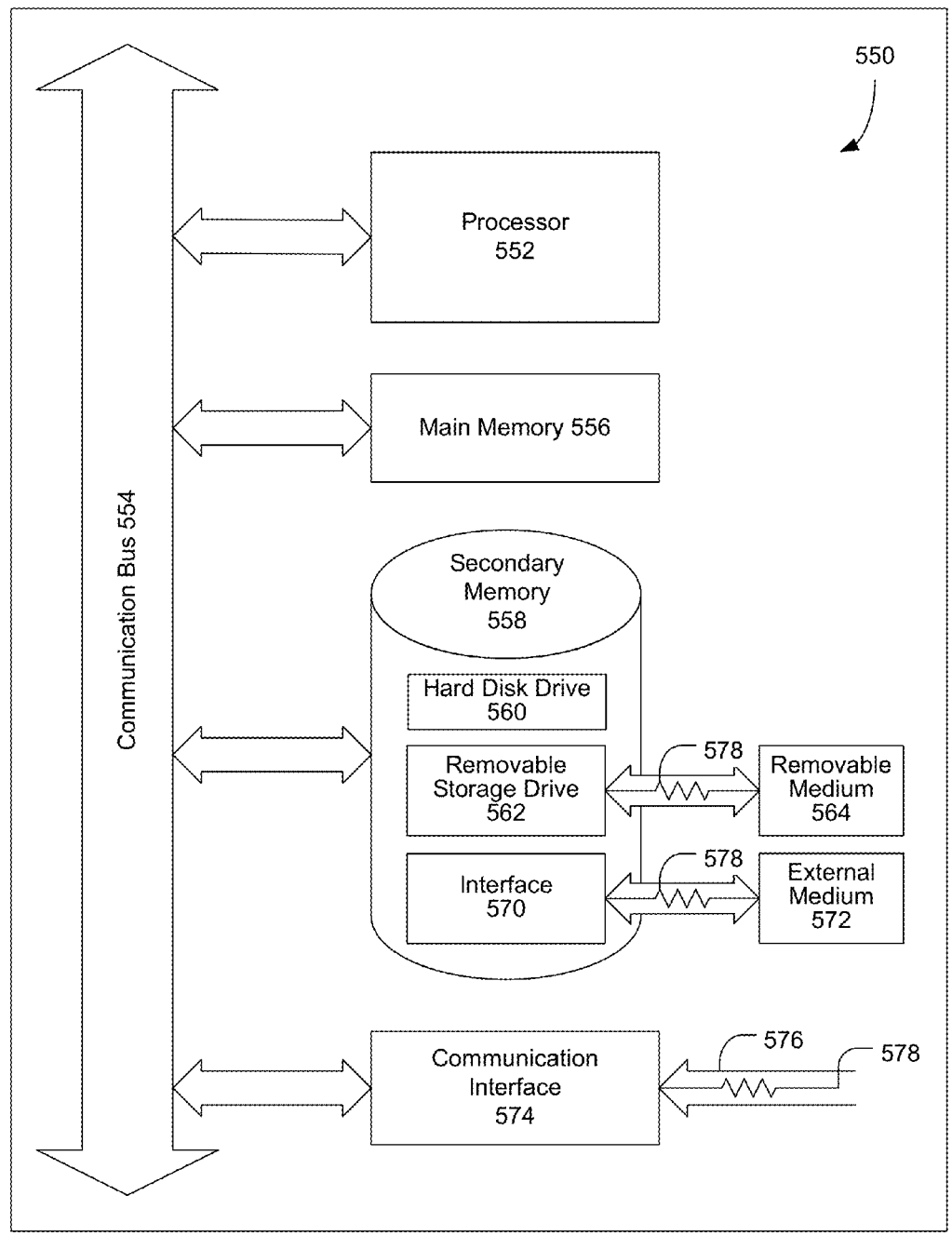
FIG. 9 is a block diagram illustrating an exemplary computer system that may be used in connection with the various embodiments described herein.

FIG. 9 is a block diagram illustrating an exemplary computer system 550 that may be used in connection with the various embodiments described herein. For example, the computer system 550 may be used in conjunction with the various types and embodiments of scanning systems described above. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of an embodiment as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited by the described embodiments.

The invention claimed is:

1. A system for capturing a digital image of a slide, the system comprising:
    an objective lens having a single optical axis;
    a beam splitter optically coupled to the objective lens and configured to provide an image of a sample from the objective lens to a plurality of sensors;
    a first sensor optically coupled to the objective lens via the beam splitter and configured to capture a first portion of the image; and
    a second sensor optically coupled to the objective lens via the beam splitter and configured to capture a second portion of the image at substantially the same time as the first sensor captures the first portion of the image;
    wherein an edge of the first portion of the image is adjacent to an edge of the second portion of the image, and each of the edges is orthogonal to a scan direction.

2. The system of claim 1, further comprising a motorized stage configured to move the sample relative to the objective lens in the scan direction.

3. The system of claim 2, wherein the motorized stage is configured to move the sample at a constant velocity.

4. The system of claim 1, wherein the objective lens is configured to move relative to the sample in the scan direction.

5. The system of claim 1, wherein each of the first sensor and the second sensor comprises a beam splitter and three linear detectors, wherein the beam splitter separates a portion of the image into separate color paths, and each of the separate color paths is captured by a different one of the three linear detectors.

6. The system of claim 1, wherein each of the first sensor and the second sensor comprises a tri-linear array comprising three linear sensor arrays, wherein each of the three linear sensor arrays is covered with a different color filter.

7. The system of claim 1, further comprising at least one data processor which aligns the first portion of the image and the second portion of the image into a contiguous portion of the image.

8. The system of claim 1, further comprising at least one data processor which processes the captured first portion of the image and the captured second portion of the image in parallel.

9. The system of claim 8, wherein the processing comprises one or more of spatial correction and compression.

10. The system of claim 1, further comprising a positioner configured to move the objective lens along the single optical axis to adjust a focus of the objective lens.

11. The system of claim 1, further comprising a web server that provides an operator interface.

12. A method for capturing a digital image of a slide, the method comprising:
    by an objective lens having a single optical axis, receiving an image of a sample;
    by a beam splitter optically coupled to the objective lens, providing the image from the objective lens to a plurality of sensors;
    by a first sensor optically coupled to the objective lens, capturing a first portion of the image; and
    by a second sensor optically coupled to the objective lens, capturing a second portion of the image;
    wherein an edge of the first portion of the image is adjacent to an edge of the second portion of the image, and each of the edges is orthogonal to a scan direction.

13. The method of claim 12, further comprising, by a motorized stage, moving the sample in the scan direction at a constant velocity relative to the objective lens.

14. The method of claim 12, wherein each of the first sensor and the second sensor comprises a beam splitter and three linear detectors, and wherein capturing the first and second portions of the image comprises:
    by the beam splitter of each of the first sensor and the second sensor, separating the respective portion of the image into separate color paths; and
    by each of the three linear detectors of the first sensor and the second sensor, capturing a different one of the separate color paths.

15. The method of claim 12, wherein each of the first sensor and the second sensor comprise a tri-linear array comprising three linear sensor arrays, wherein each of the three linear sensor arrays is covered with a different color filter.

16. The method of claim 12, further comprising, by at least one data processor, aligning the first portion of the image and the second portion of the image into a contiguous portion of the image.

17. The method of claim 12, further comprising, by at least one data processor, processing the captured first portion of the image and the captured second portion of the image in parallel.

18. The method of claim 12, further comprising, by a positioner, moving the objective lens along the single optical axis to adjust a focus of the objective lens.

19. A system for capturing a digital image of a slide, the system comprising:
   an objective lens having a single optical axis;
   a beam splitter optically coupled to the objective lens and configured to provide an image from the objective lens to a plurality of sensors;
   a first sensor optically coupled to the objective lens via the beam splitter and configured to capture a first portion of the image at a first focus level; and
   a second sensor optically coupled to the objective lens via the beam splitter and configured to capture a second portion of the image at a second, different focus level at substantially the same time as the first sensor captures the first portion of the image at the first focus level.

20. The system of claim 19, wherein the first portion of the image and the second portion of the image are the same.

* * * * *